Patented Nov. 25, 1941

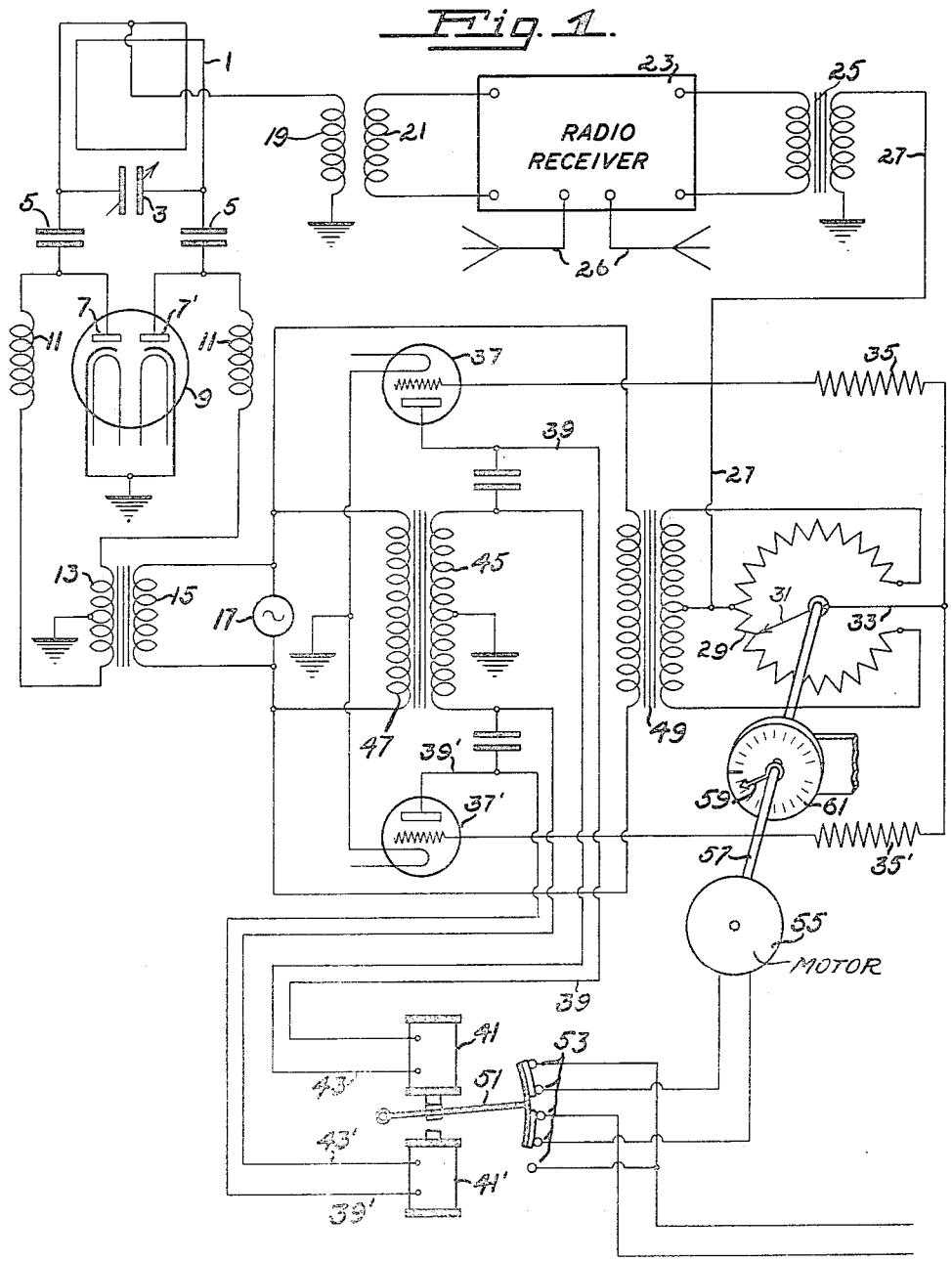

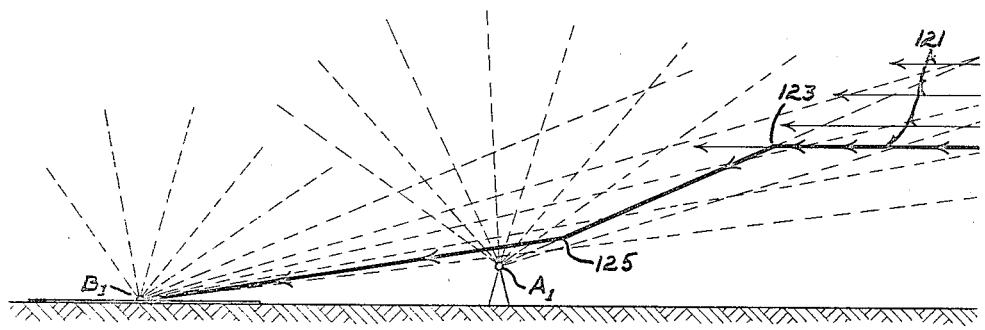
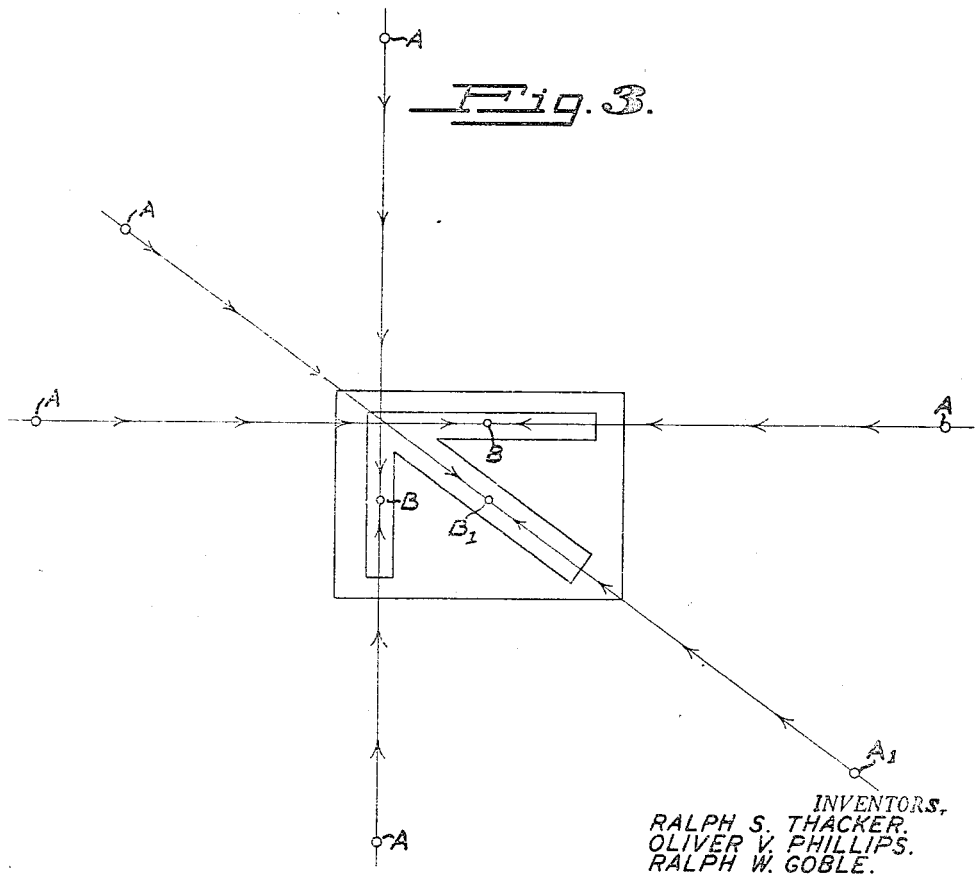

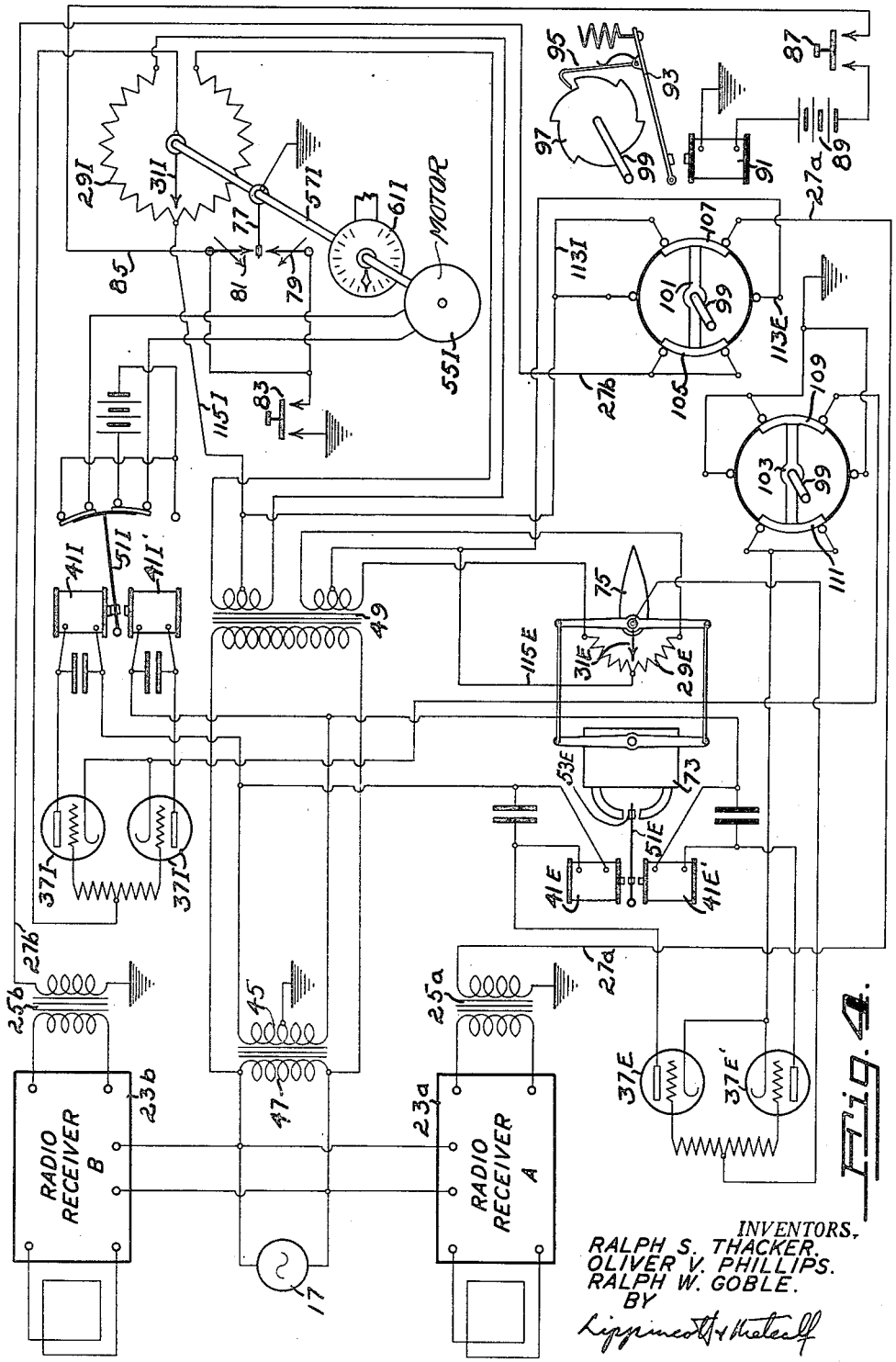

2,264,056

UNITED STATES PATENT OFFICE 2,264,056

BLIND LANDING SYSTEM FOR AIRCRAFT

Ralph S. Thacker, West Los Angeles, and Oliver V. Phillips and Ralph W. Goble, Long Beach, Calif., assignors to Leo M. Harvey, La Canada, Calif.

Application March 23, 1940, Serial No. 325,632

19 Claims. (Cl. 244—1)

This invention relates to radio control equipment for aircraft, and particularly to a system of blind landing.

The broad object of the invention is to provide equipment for landing aircraft under conditions approaching zero visibility, either by means of manual control in accordance with the visual indication of the instrumental combination comprising the invention or automatically through the operation of the controls of the airplane by such combination.

Pursuant to this primary object, among the objects of this invention are: To provide a radio blind landing system which does not require the radiation of sharply defined beams of energy; to provide means of indicating to the pilot of an aircraft the attitude of such craft with respect to a horizontal axis thereof; to provide a means of controlling an aircraft with respect to its attitude about such horizontal axis; to provide equipment which, properly set, and put into operation as a plane approaches the position where it is desired to land, will automatically work out its own "blind landing problem;" and to provide equipment which will operate an airplane to cause it, at a predetermined position, to assume a definite angle of descent and maintain it thereon until it reaches a second predetermined position, and then automatically change its angle of descent for the purpose of landing.

This invention possesses numerous other objects and features of advantage, some of which, together with the foregoing, will be set forth in the following description of specific apparatus embodying and utilizing its novel method. It is therefore to be understood that the method is applicable to other apparatus, and that the invention is not limited, in any way, to the apparatus of the present application, as various other apparatus embodiments may be adopted, utilizing the method, within the scope of the appended claims.

In the annexed drawings, illustrative of this invention:

Figure 1 is a schematic drawing illustrating, in simplest terms, a horizontal position indicator which forms a part of this invention and is the basis of the entire system.

Figure 2 is a schematic diagram illustrating in elevation and in exaggerated form, the course of flight of an airplane in making a blind landing in accordance with the system of this invention.

Figure 3 is a plan view of an air field, illustrating the locations of radio transmitters for accomplishing blind landing as illustrated in Figure 2.

Figure 4 is a schematic diagram illustrating the combination of two sets of apparatus of the type shown in Figure 1 with the associated equipment for automatically controlling the landing of the plane.

In copending application, Serial No. 314,891, filed January 20, 1940 by Ralph S. Thacker, on a Proportional control system, and in certain other applications referred to in the afore-mentioned copending application, there is disclosed equipment for controlling the horizontal course of an aircraft in accordance with radio signals. The present invention is an extension of and an improvement on the devices shown and described in said application, adapting the principles therein contained together with certain others to vertical control and to the automatic working out of the blind landing problem.

Considered from the aspect of method, the present invention involves the transmission of a pair of radio signals. Preferably these signals are horizontally polarized, but it is sufficient if they have a horizontal component. One of the signals is transmitted from a point on the runway substantially at the position at which it is desired to land. The second is transmitted from a point on a line with the runway and substantially the distance therefrom at which it is desired to assume the final angle of glide at which the landing is to be made. Neither of these signals need or should have marked directional characteristics in the vertical plane, at least in the sector from which the approach is to be made, although reflectors may be used behind the antennae to direct the major portion of the energy into the sector of approach, in order to conserve power.

In making a blind landing the airplane is alined with the runway, preferably by means of the radio directional control system described in the aforementioned application, and is flown toward the runway substantially in horizontal attitude, while measuring the angle of reception of the waves from the latter of the two transmitting points previously referred to. When this angle attains a certain predetermined value, corresponding to the desired angle of descent, the plane is headed so that its axis of flight is directly toward the source of the wave, and during the course of the descent along the line thus defined the changing angle of reception of the wave radiated from the point on the runway is measured. When this second angle reaches a predetermined value the course of descent is again altered, so that the axis of flight of the plane is directly toward the point of origin of this second wave, and this course is adhered to until landing is accomplished. It is to be understood that the term "axis of flight" as used herein indicates a line connecting successive instantaneous positions on the actual course of the airplane, and will ordinarily form a small angle with the longitudinal axis of the plane, the magnitude of this angle being a function of the angle of attack of the plane at the speed at which it is desired to fly, and of the wind velocity.

From the point of view of apparatus used, the invention comprises a radio receiving system having a vertical directional characteristic and a null axis corresponding approximately to the longitudinal axis of the plane, with means for effectively reversing the sense of the output current of such system in accordance as the radio waves are received from above or below the null axis. Means are provided for shifting the null axis into coincidence with the direction of reception of the radio wave being received, and for indicating the angle of shift, so that the angle of reception may be determined with respect either to the longitudinal axis of the airplane or to its flight axis.

Preferably two antennae and receiving systems are used, one of which is tuned to the transmitter located on the runway and the other tuned to the transmitter in line therewith. The indicating mechanism above-described is first connected to the receiver tuned to the second or "A" transmitter, and the other is connected to the receiver tuned to the transmitter on the runway or "B" transmitter, and there is provided elevator control equipment adapted for operation by the output of either of the two radio receivers. Switching equipment, operated by the indicating mechanism, transfers the operation of the indicating and control mechanism between the two radio receivers in accordance with a fixed schedule. When the device is first put into operation the indicating equipment and switching equipment are connected for operation by the wave from the "A" transmitter, and the elevator controls are disconnected from either of the two receivers. When the indicator reaches the predetermined angle from the "A" transmitter, the switching mechanism operates to transfer the receiver operating on the "A" transmitter's wave from the indicator to the elevator control, and connects the "B" receiver to the indicator. As the plane descends toward the "A" transmitter, the angle of reception of the waves from the "B" transmitter increases until, at a proper predetermined value, the switching mechanism again operates to disconnect the first receiver from the elevator control and substitute the "B" receiver, so that the plane is held with its flight axis directed toward the "B" transmitter until the landing is effected.

The operation of the invention will be better understood by a detailed description of the apparatus involved.

Figure 1 shows, in diagrammatic form, the indicator operating connections of a radio receiver embodying certain aspects of the invention. Referring to this drawing, the loop 1 differs from those used in the ordinary horizontal direction finders of right-and-left indicating types primarily in that it is balanced to ground about a horizontal axis instead of a vertical axis, and, since it is intended to operate upon a horizontally polarized component of radiation, there is superimposed upon the usual figure-eight pattern of the loop a "horizontal antenna component" instead of the usual "vertical antenna component." With this exception the functioning of this loop antenna is essentially the same as those described in the copending application previously referred to, to which application reference is made for a discussion of the theory involved. It is to be understood that the loop is preferably mounted in fixed relation to the aircraft upon which it is to be employed, with the plane of the loop vertical.

The loop is tuned by a variable condenser 3 to the desired radio signal. Each of its ends is connected through a condenser 5 to one of the anodes 7, 7' of a double diode 9, whose cathodes are grounded.

Connected to the two anodes through radio frequency choke coils 11, 11 are the two ends of a transformer secondary 13 having a grounded center tap, and the primary 15 of the transformer is supplied with alternating current from a source 17, which may be an oscillator, a motor generator, or any other suitable power supply having a symmetrical waveform.

As is described in the copending application above-cited, the voltage supplied by the transformer secondary 13 to the two anodes 7, 7' renders the paths between these anodes and their respective cathodes alternately conducting and insulating, and thus effectively connects the terminals of the loop alternately to ground, thus imposing the horizontal antenna effect of the loop upon the loop current in opposite phase during successive half cycles of operation of the generator 17. Since the phase of the circulating current in the loop, due to the loop effect, reverses with respect to that due to the antenna effect as the axis of the loop approaches, coincides with, and passes through the direction of reception of the wave, and since the effect of alternately grounding the two ends of the loop through the tube 9 is to add the horizontal antenna effect to the loop effect alternately in opposite directions, it follows that the potentials in the coupling coil 19, connected to a center tap on the loop, and grounded at its other end, increase and decrease in step with the potential from the source 17. In other words, the coil 19 carries an alternating current whose sense (or phase with respect to that of the source 17), depends upon the sense of the angle between the axis of the loop and the direction of reception of the wave, and whose magnitude varies with the magnitude of the angle between the loop axis and the direction of reception, the amplitude being zero when axis and direction of reception coincide.

Coupled to the coil 19 is the input coil 21 in the input circuit of a sensitive radio receiver 23, which detects and amplifies the radio signals as received by the loop and as modulated by the source 17. The output of the receiver is through an audio frequency output transformer 25, and although it is possible to use voice or code-modulated waves to actuate the device, and there may, therefore, be provided additional circuits responsive to such modulations, the time constants of the circuits feeding the transformer 25 are preferably made such as to suppress any voice modulations, so that the audio frequency current flowing in the secondary of the transformer 25, and the potentials developed by said secondary, correspond to the angular disposition of the loop with respect to the received wave and its modulation by the source 17.

This correspondence should preferably be as exact as possible, and in order to preserve the relationship there may be provided an additional antenna 26 of non-directional type coupled within the receiver to an automatic volume control. Any other method of adjusting the sensitivity of the receiver to compensate for signal strength, e. g., a tuning meter, may, of course, be used.

The secondary of the output transformer 25 connects through the lead 27, a potentiometer winding 29, a movable tap or contact 31 and the conductor 33, to a pair of branch circuits connecting through balanced resistors 35, 35' to the grids of a pair of amplifier or grid glow tubes, as may be preferred, 37, 37'. The cathodes of these tubes are brought to a common ground. Their plates connect respectively through the leads 39, 39', the opposed relay coils 41, 41', and leads 43 and 43' to opposite ends of the secondary coil 45 of a transformer whose primary coil 47 is supplied by the source 17. It follows as a result of these connections that the tubes 37 and 37' become capable of conducting a space current alternately as their plates alternately become positive. The alternations occur in time with the modulation of the current in the transformer 25 by the source 17, the grids of the two tubes swinging positive and negative together. Due to the controlling action of the grids of these tubes, that tube whose plate is positive at the time that both grids are positive will carry current, whereas that tube whose plate is negative at the time the two grids are positive will carry no current or, to state the matter conversely, that tube whose grid is negative at the time its plate is positive will carry little or no current, whereas the other will carry current which is proportional to the amplitude of the modulation component in the transformer 25 produced by the source 17.

Strictly speaking, the exact correspondence of conductivity of the tube 37 to modulation components in the transformer 25 is true only when the movable tap 31 of the potentiometer is in its central or neutral position, since it is the function of this potentiometer to add a reverse-phase component to the modulating component in the receiver output. In order to accomplish this, a transformer 49 has the terminals of its secondary connected across the two ends of the potentiometer 29, and a center tap connected to the center of the potentiometer winding. This transformer is also supplied from the source 17. Since the lead 27 from the receiver output is connected to the center of the transformer winding, it will be seen that when the moving tap 31 is in the center position, no potential from the transformer 49 is applied to the grids of the tubes 37, 37'. If, however, the tap 31 is moved from its central or neutral position, there will be added to the receiver output potential a transformer potential in step with that due to the modulation component from the receiver.

As the device is actually operated, the transformer potential is always applied in such phase as to buck that from the receiver modulation, and it will be seen that by rotating the potentiometer contact 31 to the proper position, a point can always be found at which the two potentials neutralize each other, and that at this point the two tubes 37, 37' will be exactly balanced. The degree of rotation of the potentiometer contact necessary to produce this balance is a measure of the intensity of the modulation component in the transformer 25, and since the amplitude of this component is a function of the deviation of the angle of reception of the radio signals from the coil axis, and since the sense of this component is dependent upon the direction of such deviation, the direction and magnitude of the movement of the potentiometer contact becomes a measure of the angle of reception of the radio wave.

The function of the tubes 37 and 37' is to cause this balance to take place automatically. The relay coils 41 and 41' are shown as operating on a common armature 51, which actuates reversing contacts 53 to control the direction of rotation of a reversible electric motor 55. This motor is geared to a shaft 57, which carries the potentiometer contact 31, and also an index 59 movable over a dial 61 to indicate the angular position of the contact. This dial is preferably calibrated to read directly in angle of reception of the radio wave with respect to the null axis of the loop 1.

It is to be understood, of course, that the showing of the relay, motor, and dial are broadly symbolic in character, and that in practice sensitive type relays are used, and the motor, dial, and potentiometer, are compactly organized to provide an indicator which does not differ greatly in actual appearance from ordinary aircraft navigating instruments.

It will be seen that the effect of an unbalance on the tubes 37, 37' is to cause a rotation of the motor 55 in such a direction as will correct that unbalance and reduce it to zero, and that, should the motor travel too far, the result will be an unbalance in the opposite direction which also will automatically correct itself. The resultant effect is that the equilibrium point of the system 1, as distinguished from the geometrical axis of coil 1, and as defined by the effect on the operating mechanism, is shifted into coincidence with the direction of reception of the received waves. Should this direction shift toward the geometrical axis of the loop the effect is to apply an unbalance in the opposite direction upon the tubes 37, 37', which again causes a rotation of the motor to correct that unbalance.

The unit thus described differs from the proportional control system of the aforementioned copending application in two important details; first, it is adapted for operation in the vertical instead of the horizontal plane, and second, instead of operating through a limited angle on each side of the neutral position, and following the received wave only within these limits, which are rigidly prescribed by the permissible motion of the control surfaces, it may be made to encompass as wide an angle as is desired.

Although the simple indicator has a definite field of usefulness, per se, its primary function is for use with a combination such as is shown schematically in Figure 4. This shows the apparatus as combined with a proportionating elevator control to form a complete blind landing system.

In Figure 4 the detail of the two loop modulating systems used with the two receivers 23a and 23b has been omitted for the purpose of simplicity, and it is to be understood that these receivers include all such detail as is shown in Figure 1. The single modulating source 17 serves for both receivers, which feed their audio frequency output into the two transformers 25a and 25b respectively.

Through switching equipment which will be described in detail later, either of the two output leads 27a and 27b can be connected to the indicating circuit, which is substantially the same as is shown in Figure 1 and which occupies the upper portion of the drawing, the various parts carrying the same reference characters as those of Figure 1, distinguished by the letter "I," and comprising the balanced output tubes, the relay coils, the reversing switch, and the motor 55I for operating the movable contact of the potentiometer 31I.

A very similar apparatus is shown in the lower half of the drawing. The function of this apparatus is to operate the elevator controls, and the parts, corresponding to the similar parts of the indicator equipment, are distinguished therefrom by the latter "E" added to the reference characters.

The correspondence is exact as far as the relay armature 51E. This armature, instead of actuating an electrical reversing switch, actuates the pneumatic reversing switch 53E of a servo motor 73 which operates the elevator of the plane. The movable contact 31E of the potentiometer 29E is moved in accordance with the motion of the elevator, in the same manner as the rudder operates the similar potentiometer as described in the above-identified copending application. As indicated above, the range of the potentiometer 29E is more limited than that of potentiometer 29I, and will only serve to deflect the null axis of whichever receiver is associated with the control equipment at any particular time through a limited arc, and will not follow the received waves indefinitely.

The transformer 49 is provided with two secondaries, one of which is connected to potentiometer 29I and the other to 29E. Separate transformers can, of course, be used if desired.

Transfer of the two receivers as between the indicating and the control apparatus is accomplished by the indicator itself. There are obviously many ways of accomplishing this, and there would be no purpose in going into many of the permutations of apparatus by which it could be done. The mechanism shown is therefore to be considered as merely one way of attaining the desired end, and not necessarily as the preferred manner of so doing.

Mounted on the shaft 57I of the indicator is a grounded contact arm 77 which engages with either of two adjustable contacts 79 and 81. The contact 79 is engaged when the indicator reaches a predetermined angle below the axis of reference, while the contact 81 is engaged at an angle above the axis. A key 83 is also preferably provided, and connected to both contacts, so that the circuit may be grounded manually, if desired.

Connecting to the three grounding contacts is a lead 85 which connects through a switch 87 and a battery or other source 89 to the coil 91 of a relay and thence to ground. The relay is of the step-by-step type, its armature 93 being provided with a pawl 95 which engages the ratchet wheel 97. Closing any one of the three contacts 79, 81, or 83 will therefore excite the magnet 91 and advance the ratchet wheel one step.

Mounted on the ratchet wheel shaft 99 are insulating arms 101 and 103 respectively, and each arm carries at each end thereof a conducting sector, these sectors being indicated by the reference characters 105, 107, 109 and 111. Each sector is of the proper length to engage and connect two out of the six contacts which are arranged around the periphery of each switch. Each operation of the relay rotates the arms and conducting sectors one-sixth of a revolution, which, since the sector switches are symmetrical, gives three circuit combinations. The contacts on the arm 101 accomplish the transfer of the connections from receivers 23a and 23b between the indicating and control equipment. Thus, in the position shown, lead 27a from the first receiver connects through the sector 107 to lead 113I and thence through lead 115I to the center tap of the potentiometer 29I of the indicating equipment. With the relay in this position, lead 27b is open, since sector 105 merely shorts two contacts which are connected to this same lead. Receiver 23a is therefore connected to the indicator and receiver 23b is idle.

If one of the three actuating contacts 79, 81 or 83 be now closed, the relay will advance one step, and sector 107 will connect lead 27a to lead 113E, instead of to lead 113I as before, so that receiver "A" is now connected to the control instead of the indicating equipment. At the same time, sector 105 moves to connect lead 27b to 113I, causing receiver 23b to actuate the indicating apparatus.

The next operation of the step-by-step mechanism associates receiver "B" with the control equipment, and opens the circuits both of receiver 23a and the indicator, leaving them idle over this period. Further operation of the step-by-step circuit repeats the cycle.

The contact arm 103 also operates a three-way switch of the same general type as that just described. Its function is to break the plate circuits of the output tubes of the indicating and control equipment respectively when these equipments are idle. This is most simply done by interrupting the circuits between the cathodes of these tubes and ground. This expedient is not strictly necessary as regards the indicator, but is required in the case of the elevator control in order to free this control for manual operation, since the effect of the voltage from the proportionating transformer 49 is always to tend to bring the control back to neutral.

It is, of course, always possible to free the servo motor from the control in some other manner, but since it may be desirable upon occasion to utilize the same servo motor under an automatic control other than those described, the expedient of disconnecting the output tubes is probably always preferable.

Figure 3 is a plan of a landing field and its surrounding area, indicating the locations of the transmitters utilized in accordance with this system of blind landing. The transmitters marked "A" are located in line with the various runways, at a distance from the landing point which is determined by the position where it is desired to assume the final attitude of glide into the landing. The transmitters marked "B" are located at the center of the runways. With respect to these latter transmitters, antenna systems located on the runways in such fashion that they will not interfere with the landing of the plane are well known, and have been used in connection with other systems of blind landing.

Assuming that a landing is to be made on the main runway, from southeast to northwest, the two transmitters designated in Figure 3 as $A_1$ and $B_1$ would be used. Although any system of directional control may be utilized to aline the incoming ship with the runway, the most accurate is believed to be that disclosed in the copending application of Goble and Phillips entitled "Radio directional control for aircraft," Serial No. 314,854, filed January 20, 1940, now Patent No. 2,247,294, June 24, 1941, particularly as modified in the afore-mentioned copending application.

In making a landing the plane is flown toward the field on a horizontal course as indicated by any of the arrows 121 in Figure 2, say along the course indicated by the heavy line. During this phase of the landing receiver 23a, tuned to the signals from transmitter A1, is connected to the indicating equipment, and hence is indicating continuously the increasing vertical angles between the axis of the aircraft and the paths of the radiation from transmitter A1. The index 59 is therefore dipping increasingly, and the contact arm 77 is approaching the contact 79 as the angle becomes greater. When this angle reaches a predetermined value, as at the point indicated by the reference character 123, the contact with 79 is closed and control of the elevators is assumed by receiver 23a, while receiver 23b takes over the indicator.

The elevator controls are set to maintain the axis of flight, rather than the longitudinal axis of the plane, perpendicular to the wavefront of the signal from transmitter A1, or, in other words, to maintain the line of flight along the line of radiation from the transmitter. As the plane follows this course toward transmitter A1, the angle during the period of descent from point 123 to point 125 the angle of reception of the wave from transmitter B1 is changing in clockwise direction, which change continues until contact 77 connects with contact 81 and again operates the step-by-step mechanism, releasing receiver 23a entirely and connecting the controls to receiver 23b. From this point receiver 23b so operates the elevators as to bring the plane into its landing along the proper angle of glide, with the flight axis of the plane following the line of radiation normal to the wavefront from transmitter "B."

There are a number of points in connection with this procedure which may not be self-evident and should, therefore, be mentioned. The first of these is that we are interested in axes of flight rather than in the axis of the fuselage of the plane. In a well designed plane the fuselage is substantially horizontal in normal flight, i. e., in flight at normal speed. If the speed is reduced, however, a higher angle of attack is necessary to maintain the required lift on the plane. During the glide from point 123 to point 125 it is not out of order to maintain a flight at the same air speed as when flying horizontal, and if this be done the nose of the plane will be pointed down at substantially the same angle as the angle of glide. From point 125 into the landing, the landing flap will usually be lowered, increasing the drag, and increasing the effective angle of attack of the wings, so that again it is possible that the nose of the plane will be pointed at the actual point of landing, and the axis of flight may still coincide with the axis of the plane. This is not necessarily the case, however, particularly in planes which do not use flaps, and in this case, when the speed is reduced for the purpose of landing, the axis of flight may deflect quite sharply downward from the axis of the plane itself. This can be compensated for by setting the loop of receiver 23b at such an angle to the plane axis as to measure the received waves with reference to the flight axis. Obviously a similar procedure can be carried out with respect to receiver 23a if the landing program is such that the angle of attack during the first glide from point 123 to point 125 differs materially from that in normal flight. Where the measured angles are with respect to any axis other than the actual geometrical axis of the airplane, allowance for this must be made in determining the settings of contacts 79 and 81. It is not necessary that these settings be referred to any particular axis; it is merely necessary that contact be made at the proper point.

A different situation arises when the landing is to be made in the face of a strong head wind. This is not the usual condition, since a strong wind will usually dissipate the sort of ground fog which makes blind landing necessary. In landing in snow or dust storms, however, the situation may arise. When the plane is set into a glide, the horizontal component of the glide depends upon the air speed and the angle of attack, and is to be measured with relation to the airstream, whereas the vertical component is absolute with relation to the ground. With the airstream moving in opposition to the motion of the plane (i. e., with a head wind), the horizontal component of the glide as measured with relation to the ground is shortened, for a given angle of attack, while the vertical component remains the same. This results in a steeper glide, and if a landing is to be made under such conditions allowance must be made therefor in setting the positions of the contacts 81 and 79, and, of course, in the elevator settings.

After the landing has been accomplished, the equipment is placed in condition for its next cycle of operation by operating the manual key 83 to operate the step-by-step mechanism and reestablish the initial conditions preparatory to a new cycle of operation. If desired, the switch 87 may then be opened, which disconnects the step-by-step relay and under these conditions receiver 23a may be tuned to any other station whose angle with respect to the plane it may be desired to ascertain, but which it is not desired to use for landing purposes. Furthermore, the possibilities of automatically switching the equipment have been by no means exhausted in the particular example given. For instance, instead of releasing receiver "A" and the indicating mechanism at the instant that receiver "B" is connected to the controls, it would be equally feasible to switch receiver "A" back to the indicator at this point.

Various other possibilities of use of the device will also be apparent. For example, at long distances from the transmitters, the wavefronts will be substantially vertical, and therefore substantially level flight may be maintained for long periods by connecting one of the receivers to the control equipment and tuning that receiver on a distant station, only providing that the necessary horizontally polarized component of radiation be present. Lateral control can also be maintained by receiving a suitable wave from a considerable distance to one side of the plane and connecting the servo motor 73E to operate the ailerons instead of the elevator, the loop, in this case, of course being mounted in a plane parallel to the longitudinal axis.

Other applications of the equipment will undoubtedly suggest themselves to those skilled in the art.

The following is claimed:

1. The method of landing an aircraft on a predetermined runway in accordance with radio signals which comprises the steps of transmitting two mutually distinguishable radio signals radiating substantially uniformly over the vertical sector from which the landing is to be made, both of said signals being transmitted from points substantially on the line of said runway, flying said aircraft along said line in a direction substantially normal to the wavefronts of the signals radiated from one of said points, measuring the angle of the wavefronts radiated from the other of said points with relation to the line of flight of said aircraft, and putting said aircraft into its final glide into a landing from a point determined by a predetermined angle between said wavefronts.

2. The method in accordance with claim 1 which includes the steps of generating on said aircraft electrical currents the effective values and sense of which are functions of the magnitude and sense of the angle between said first mentioned wavefronts and the longitudinal axis of said aircraft, and controlling the attitude of said aircraft about its transverse axis in response to said currents while determining the angle of said second mentioned wavefronts.

3. The method in accordance with claim 1 which includes the steps of generating on said aircraft electrical currents the effective values and sense of which are functions of the magnitude and sense of the angle between one of said wavefronts and the longitudinal axis of said aircraft, and controlling the attitude of said aircraft about its transverse axis in response to said currents to maintain the line of flight of said aircraft substantially normal to said wavefronts.

4. The method of operating radiogoniometric indicating equipment for navigation which comprises the steps of receiving directionally two mutually distinguishable radio waves from two separate points, generating electrical currents whose effective magnitude and sense are a function of the magnitude and sense of the angle of reception of each of said waves, actuating said indicating equipment by one of said currents, and switching the second of said currents to operative connection with said indicating equipment in response to a predetermined indication thereof of said first mentioned current.

5. The method in accordance with claim 1 wherein both waves are transmitted with a horizontally polarized component and the angles measured are those of said horizontal components.

6. In blind landing equipment for aircraft having an elevator under control of a radio operated circuit, the improvement comprising a pair of vertically directional radio receivers, determining means operative by signals from either of said receivers for determining a vertical angle of reception of said signals with respect to an axis of said aircraft, elevator actuating means operative by signals from either of said receivers for controlling said elevator to change the attitude of said axis with respect to said signals, and switching means actuated by said determining means for transferring the connections from said respective receivers successively from said determining means to said elevator actuating means.

7. In blind landing equipment for aircraft having an elevator under control of a radio operated circuit, the improvement comprising a pair of loop antennae having horizontal axes and mounted on such aircraft, a radio receiver connected to each of said antennae to provide a rectified output therefrom, a commutating device connected to each of said receivers to provide an effective output current therefrom which reverses in sense, in accordance as waves are received by said antennae from above or below the null axes thereof, determining means actuated by one of said output currents for determining the angle of reception of such waves from one of said receivers, elevator actuating means actuated by the other of said output currents and connected to operate said elevator, and switching means actuated correlatively with said determining devices for transferring the connections between said respective receivers and commutating means and operative upon the attainment of predetermined angles of indication.

8. Apparatus in accordance with claim 7 wherein each receiver is successively connected to operate first the determining means and then the elevator actuating means.

9. Apparatus in accordance with claim 7 comprising means connected to the commutating means actuating said determining means for shifting the null axis of the loop antenna associated therewith to coincide with the direction of reception of said wave, said determining means being responsive to the angle of such shift.

10. Apparatus in accordance with claim 7 including indicating means actuated by said determining means and calibrated to give a visual indication of the angle of reception.

11. Apparatus in accordance with claim 7 including means for proportioning the degree of control of the elevator actuating means by the output of the connected commutating device and its associated receiver to the angle of reception of the controlling waves.

12. In combination with a radio receiver having a directional antenna and adapted to supply an output current which effectively changes in sense in accordance as waves are received from one side or the other of the null axis of said antenna, a reversible electric motor, a relay connected for operation by said output current and connected to reverse said motor in response to reversals in sense of said output current, a potentiometer having a movable contact operated by said motor and having its terminals connected to a source of current having the same frequency characteristics as the output of said receiver, a connection to said movable contact for injecting into the output of said receiver a component in opposition thereto and varying with the movement of said contact to cause an effective shift of the null axis of said antenna, and means for determining the degree of shift of said null axis.

13. Apparatus in accordance with claim 12 wherein said determining means is an electrical contact.

14. Apparatus in accordance with claim 12 wherein said determining means is a visual index.

15. In radio apparatus for controlling the elevator of an aircraft, the improvement comprising an antenna having directional characteristics in a vertical plane adapted for mounting on an aircraft, a radio receiver connected to said antenna, means for controlling the output of said receiver to effectively reverse the sense of said output in accordance with the reception of radio waves by said antenna from above or below a horizontal axis of said aircraft, a relay connected for actuation in accordance with the sense of said output current, and means actuated by said relay for controlling said elevator.

16. In radio apparatus for controlling the elevator of an aircraft, the improvement comprising an antenna having directional characteristics in a vertical plane adapted for mounting on an aircraft, a radio receiver connected to said antenna, means for controlling the output of said receiver to effectively reverse the sense of said output in accordance with the reception of radio waves by said antenna from above or below a horizontal axis of said aircraft, a relay connected for actuation in accordance with the sense of said output current and a servo motor actuated by said relay for controlling said elevator.

17. Apparatus in accordance with claim 15 wherein the antenna comprises a loop having a horizontal axis of symmetry.

18. Apparatus in accordance with claim 15 wherein the antenna comprises a loop fixed in relation to the aircraft and having a horizontal axis of symmetry.

19. Apparatus in accordance with claim 15 comprising means for proportioning the degree of attitude control applied to said aircraft by said servo motor and elevator to the angle of reception of said radio waves.

RALPH S. THACKER.
OLIVER V. PHILLIPS.
RALPH W. GOBLE.